Patented Aug. 4, 1925.

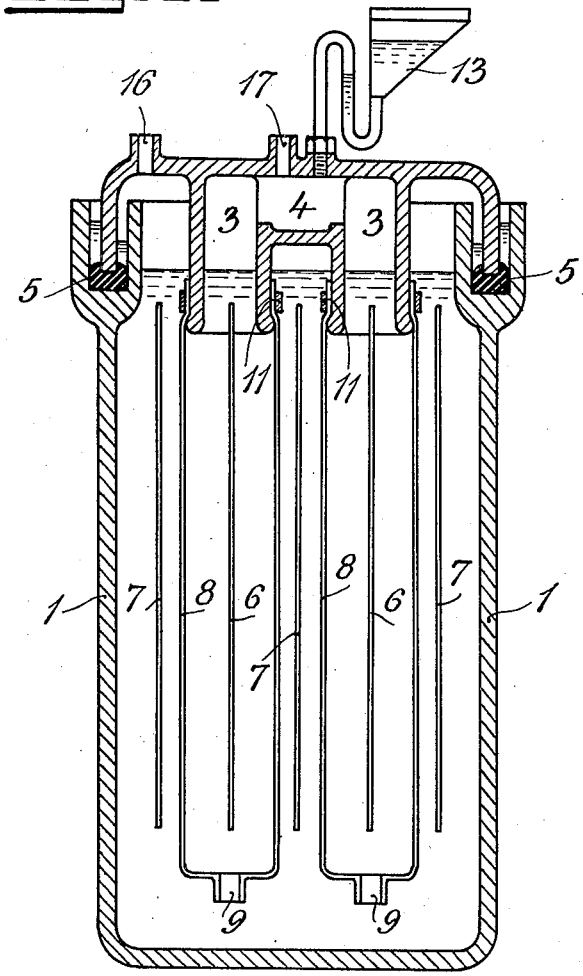

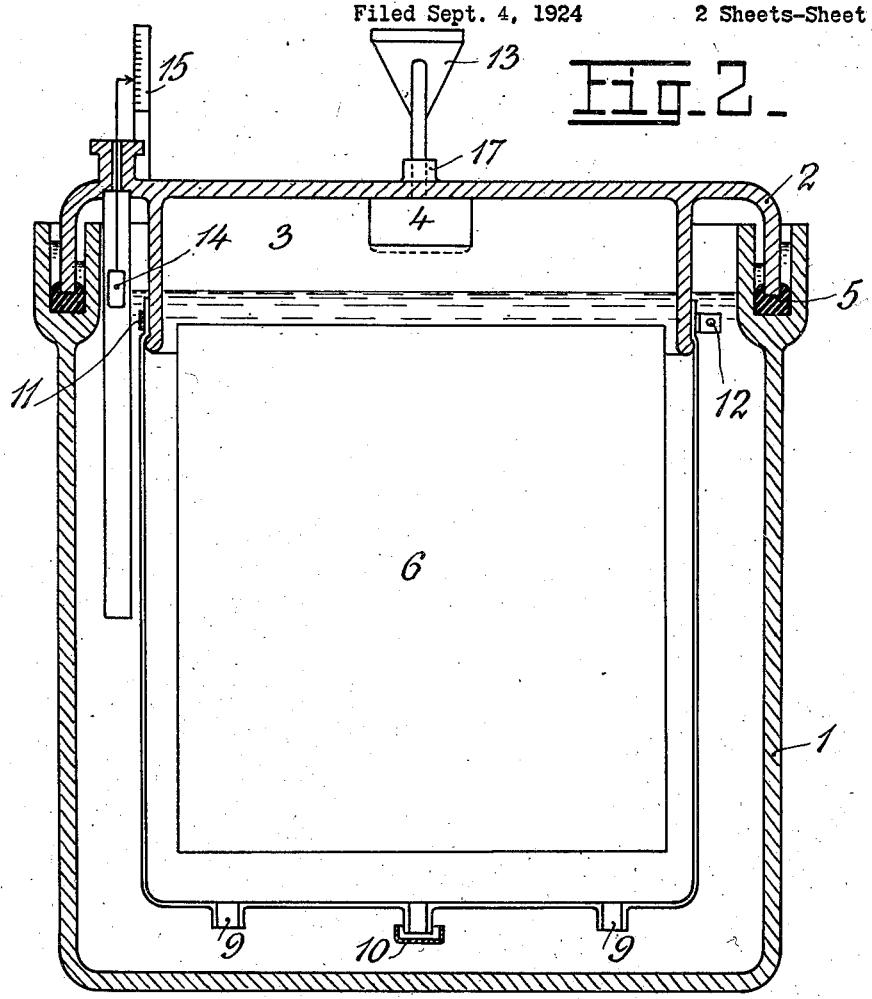
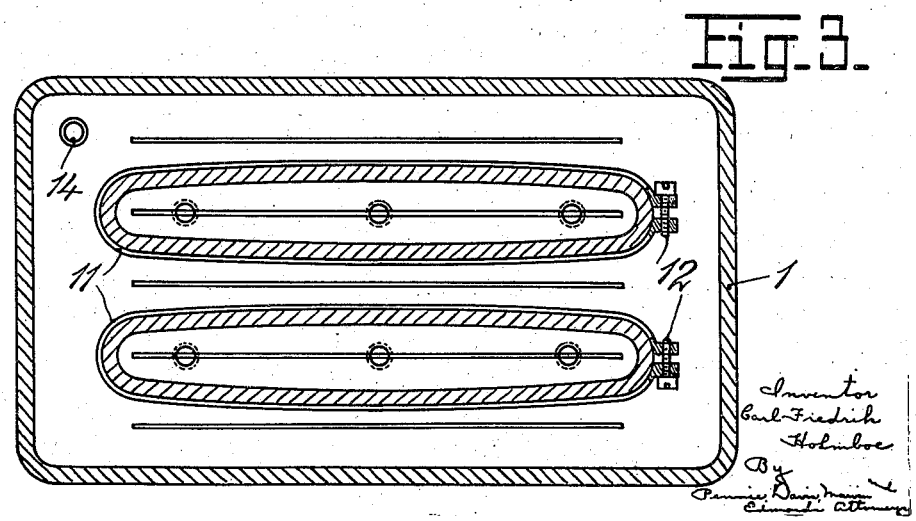

1,548,362

UNITED STATES PATENT OFFICE.

CARL FREDRIK HOLMBOE, OF RIS, NEAR CHRISTIANIA, NORWAY, ASSIGNOR OF ONE-HALF TO A/S DE NORDISKE FABRIKER DE-NO-FA, OF CHRISTIANIA, NORWAY.

ELECTROLYTIC APPARATUS.

Application filed September 4, 1924. Serial No. 735,754.

*To all whom it may concern:*

Be it known that I, CARL FREDRIK HOLMBOE, a subject of the King of Norway, residing at Villa Solheia, Ris, near Christiania, Norway, have invented certain new and useful Improvements in Electrolytic Apparatus; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to electrolytic apparatus of the type in which diaphragms and electrodes are contained in a closed cell and has for its object an apparatus which solves the problem of constructing electrolytic cells of very large dimensions which are reliable in operation, which produce a pure gas and at the same time require only a reasonable floor area.

Cells constructed in accordance with the invention further possess the advantage that they do not give off fumes of corrosive substances which are unhealthful to the operators.

A further characteristic feature of this electrolytic apparatus consists in the provision of diaphragm bags which separate the electrodes of opposite polarity from one another and which at the lower end are provided with one or more comparatively small openings for the mixing of anolyte and catholyte.

Other characteristic features of the apparatus will appear from the following:

An embodiment of the invention is illustrated in the accompanying drawing in which Fig. 1 is a vertical transverse section of a cell constructed in accordance with the invention.

Fig. 2 is a vertical, longitudinal section of the cell shown in Fig. 1.

Fig. 3 is a horizontal section of the cell.

In the illustrated example the apparatus consists of a receptacle 1 adapted to contain the electrolyte and having at the upper edge a groove serving as a seat for the cover which is described below, said groove acting also as a hydraulic seal. The receptacle 1 is provided with a cover 2 with downwardly curved edges so dimensioned as to fit into the hydraulic seal referred to above. The cover may be electrically insulated from the receptacle, as shown in the drawing by means of insulating pieces 5. The cover is provided with slightly elliptical shaped bells 3 below which electrodes 6 are arranged which receive their supply of current through spindles secured to and electrically insulated from the cover 2 (not shown in the drawing). The bells 3 are connected with a gas channel 4.

Besides the electrodes 6 which are of the same polarity, electrodes 7 of opposite polarity are provided which alternate with the electrodes 6. For the sake of simplicity the drawing illustrates an apparatus with five electrodes in total, but this number of electrodes may be increased or diminished according to the size of the apparatus. In the cover are provided two gas outlets 16, 17 for the two gases. It is of advantage in this apparatus to make use of electrodes with vertical ribs.

In order to prevent mixing of the evolved gases, which would otherwise take place on account of the great depth of electrodes, each of the electrodes under the bells 3 is surrounded by a diaphragm bag 8, which at the top is secured to the bell 3 and at the lower end nearly completely closed so as to prevent the gas evolved at the electrodes 7 from mixing with the gas evolved at the electrodes 6 and vice versa.

To maintain as far as possible a perfect ratio of weights in catalyte and analyte the lower end of each diaphragm bag is provided with one or more openings 9. The bells 3 are slightly elliptical for the purpose of enabling a complete tightening of the diaphragm bag by means of the metal hooping 11 which is clamped on by the screw 12.

Assuming that the apparatus is used to decompose water and that the supply of current is so arranged that the electrodes 7 constitute the anode and the electrodes 6 constitute the cathode then the electrolyte surrounding the cathode electrodes 6 that is inside of the diaphragm bag during operation will become concentrated and increase in specific gravity so that, in the case of a NaOH—electrolyte, sodium hydrate will accumulate around the cathode: $2Na+2H_2O=2NaOH+H_2$.

In the space surrounding the anode electrodes 7 the reverse will take place, that is a dilution of the electrolyte: $4OH= 2H_2O+O_2$.

The specific equilibrium conditions of the electrolyte will thereby become destroyed with the consequence that the heavier caustic soda lye of a higher concentration inside of the diaphragm bag will sink down and through the openings 9 and mix with the outside dilute and lighter electrolyte. This mixing is facilitated when the supply of replenishing liquid, for example distilled water, is so arranged that it is introduced into the catholyte as shown in Figs. 1 and 2.

The distilled water is poured into the funnel 13 and flows into the channel 4 and spreads to the cathode chambers 3 whereby the level of liquid therein will rise and the catalyte will become forced out through the openings 9. In the case of an apparatus with two or more electrode bells the cover is so constructed that the bells 3 are connected to the common channel 4 whereby the apparatus has only one gas outlet for the gas evolved at the electrodes 6, and one outlet for the gas evolving at the electrodes 7.

To further prevent mixing of the two gases a baffle plate 10 is arranged at the middle opening as shown in Fig. 2.

To determine the level of liquid in the receptacle 1 a float 14 is arranged in a tube secured to the cover, the said float indicating the level of liquid on the scale 15.

Cells of this construction have been built and have been in operation for an extended period for the production of hydrogen and oxygen with a current capacity of several thousands of amperes and produce hydrogen gas of 100 per cent and oxygen of about 99.75 per cent. In the hydrogen produced in the apparatus it has not been possible to detect oxygen.

I claim:

1. Electrolytic apparatus comprising a closed cell, electrodes of opposite polarity arranged therein, and a diaphragm bag surrounding each of the electrodes of the same polarity, said bags being provided in their lower part with a relatively small opening through which the catholyte and anolyte are allowed to mix.

2. Electrolytic apparatus in accordance with claim 1 in which each of the diaphragm bags is provided with a plurality of openings in its lower part.

3. Electrolytic apparatus in accordance with claim 1 having a plurality of electrodes with surrounding diaphragm bags arranged in a single closed cell.

4. Electrolytic apparatus in accordance with claim 1, provided with bells located over those electrodes that are within the diaphragm bags to collect the gas evolved inside of the bags, said bells communicating with a common channel so as to allow the gas to escape through a single pipe.

5. A closed electrolytic cell provided with gas collecting bells and diaphragm bags suspended therefrom, said gas collecting bells having an elliptical transverse sectional shape.

6. Electrolytic apparatus in accordance with claim 1 provided with means for admitting the liquid required for replenishing the electrolyte to the electrode space enclosed by a diaphragm bag.

7. Electrolytic apparatus in accordance with claim 1 in which the cell is provided with a cover having a downward bent edge, and a hydraulic seal cooperating with said downward bent edge.

In testimony that I claim the foregoing as my invention, I have signed my name in presence of two subscribing witnesses.

CARL FREDRIK HOLMBOE.

Witnesses:
MARGARET BUGGE,
ELISE PAULSSON.